United States Patent
Greim

(10) Patent No.: US 9,220,304 B2
(45) Date of Patent: Dec. 29, 2015

(54) POWER SUPPLY SYSTEM FOR PORTABLE AEROSOL-GENERATING DEVICE

(71) Applicant: Philip Morris Products S.A., Neuchatel (CH)

(72) Inventor: Olivier Greim, Villars-Burquin (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 14/370,389

(22) PCT Filed: Dec. 28, 2012

(86) PCT No.: PCT/EP2012/077085
§ 371 (c)(1),
(2) Date: Jul. 2, 2014

(87) PCT Pub. No.: WO2013/102612
PCT Pub. Date: Jul. 11, 2013

(65) Prior Publication Data
US 2014/0348495 A1    Nov. 27, 2014

(30) Foreign Application Priority Data

Jan. 3, 2012  (EP) .................................... 12150114
Feb. 13, 2012 (EP) .................................... 12155241

(51) Int. Cl.
*A01G 13/06* (2006.01)
*A24F 13/00* (2006.01)
*A24F 47/00* (2006.01)
*H05B 3/02* (2006.01)

(52) U.S. Cl.
CPC ................ *A24F 47/008* (2013.01); *H05B 3/02* (2013.01)

(58) Field of Classification Search
None
See application file for complete search history.

(56) References Cited

U.S. PATENT DOCUMENTS

| 1,674,617 | A | 6/1928 | De Benedictis |
| 4,612,491 | A | 9/1986 | McCarty et al. |
| 5,878,752 | A | 3/1999 | Adams et al. |

(Continued)

FOREIGN PATENT DOCUMENTS

| CN | 101862038 A | 10/2010 |
| CN | 102264251 A | 11/2011 |

(Continued)

OTHER PUBLICATIONS

Extended European Search Report issued on Oct. 26, 2012 in the corresponding European Application No. 12150114.2.

(Continued)

*Primary Examiner* — Thor Campbell
(74) *Attorney, Agent, or Firm* — Oblon, McClelland, Maier & Neustadt, L.L.P.

(57) ABSTRACT

The present disclosure relates to an electrical system including a primary device and secondary device, wherein the primary device includes: a source of electrical power; a cavity configured to receive the secondary device; at least one electrical contact within the cavity configured to contact a corresponding contact on the secondary device when the secondary device is in the cavity, the at least one electrical contact being electrically connected to the source of electrical power; and a lid moveable between a first position to retain the secondary device in contact with the at least one electrical contact, and a second position in which the secondary device is free to move out of contact with the at least one electrical contact. The electrical system may relate to an aerosol-generating system having an aerosol-forming substrate.

10 Claims, 3 Drawing Sheets

(56) References Cited

U.S. PATENT DOCUMENTS

| | | |
|---|---|---|
| 5,934,289 A | 8/1999 | Watkins et al. |
| 2002/0005207 A1 | 1/2002 | Wrenn et al. |
| 2003/0226837 A1 | 12/2003 | Blake et al. |
| 2004/0020500 A1 | 2/2004 | Wrenn et al. |
| 2004/0261802 A1 | 12/2004 | Griffin et al. |
| 2006/0157466 A1 | 7/2006 | Miyazaki et al. |
| 2010/0163063 A1 | 7/2010 | Fernando et al. |
| 2010/0313901 A1 | 12/2010 | Fernando et al. |

FOREIGN PATENT DOCUMENTS

| | | |
|---|---|---|
| DE | 203 14 626 | 7/2004 |
| EP | 2 201 850 | 6/2010 |
| EP | 2 253 233 | 11/2010 |
| FR | 2 354 720 A1 | 1/1978 |
| GB | 741 101 A | 11/1955 |
| GB | 2 301 040 A | 11/1996 |
| KR | 10-1062248 B1 | 9/2011 |

OTHER PUBLICATIONS

Extended European Search Report issued on Aug. 29, 2012 in the corresponding European Application No. 12155241.8.

Combined Office Action and Search Report issued Mar. 9, 2015 in Chinese Patent Application No. 201280069189.9 (with English language translation).

International Search Report Issued Aug. 29, 2013 in PCT/EP12/077085 Filed Dec. 28, 2012.

Office Action issued Jun. 11, 2015 in Korean Patent Application No. 10-2015-7001215 (with English language translation).

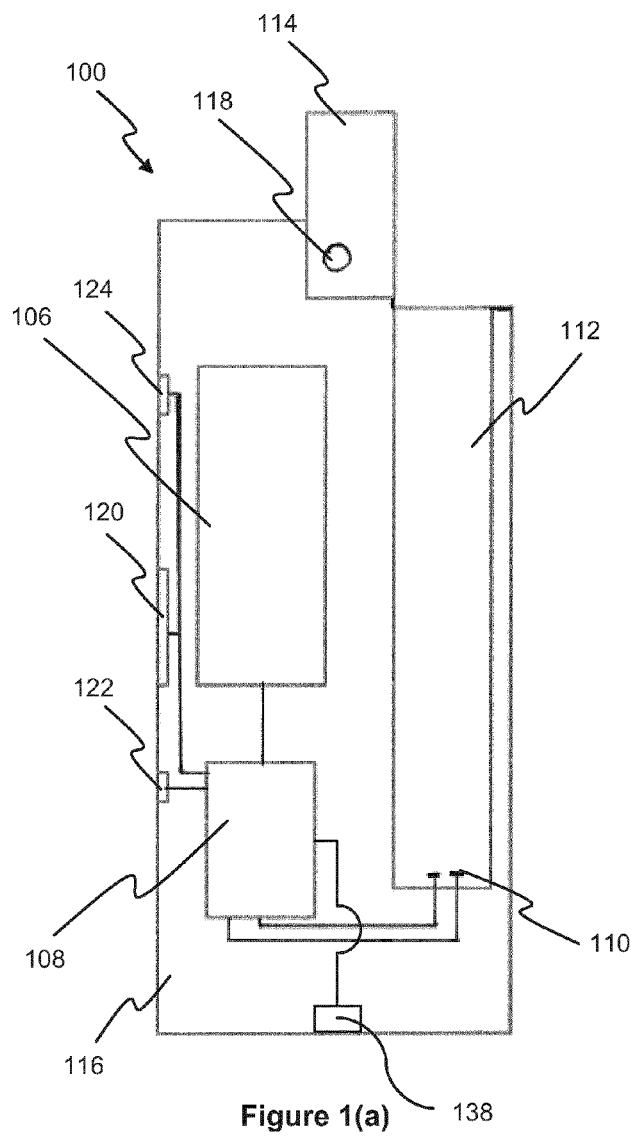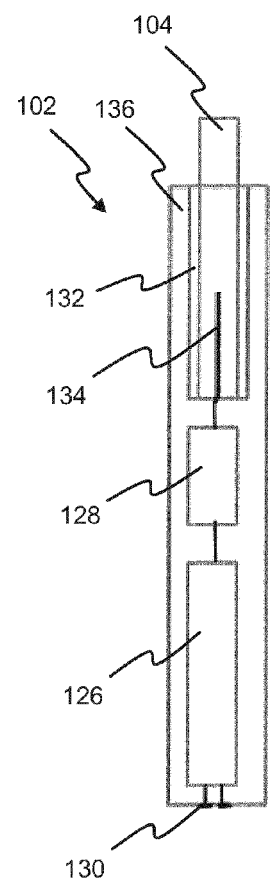
Figure 1(a)
Figure 1(b)

POWER SUPPLY SYSTEM FOR PORTABLE AEROSOL-GENERATING DEVICE

CROSS REFERENCE TO RELATED APPLICATION

This application is a national phase application based on PCT/EP2012/077085, filed on Dec. 28, 2012.

The present disclosure relates to electrical systems in which a secondary device having a rechargeable source of electrical power is recharged by a primary device. In particular, the disclosure relates to a system comprising a portable aerosol-generating device that is connectable to a primary power supply device.

An example of such an electrical system having a portable device and a primary charging device is an electrically operated smoking system. Electrically operated smoking systems significantly reduce sidestream smoke, as compared to lit-end smoking devices, while permitting a consumer to selectively activate the smoking system during the smoking experience. Electrically operated smoking systems typically include an aerosol-generating device having a housing for receiving an aerosol-generating article or a smoking article, heating elements to generate an aerosol, a power source and the necessary electronic circuitry. The circuitry may be, for example, circuitry for controlling the heating and charging of the aerosol-generating device. Having a portable device and primary charging device provides the advantage of a small aerosol generating device being the portable device that is easy to hold and use, but also the ability to quickly and conveniently recharge the aerosol generating device for repeated use.

It is an object of the invention to provide for enhanced operation of this type of electrical system.

According to a first aspect of the present disclosure, there is provided an electrical system comprising a primary device and secondary device, wherein the primary device comprises: a source of electrical power; a cavity configured to receive the secondary device; at least one electrical contact within the cavity configured to contact a corresponding contact on the secondary device when the secondary device is in the cavity, the at least one electrical contact being electrically connected to the source of electrical power; and a lid moveable between a first position to retain the secondary device in contact with the at least one electrical contact and a second position in which the secondary device is free to move out of contact with the at least one electrical contact.

Such a system, advantageously, allows for reliable and efficient charging of the secondary device through ensured electrical contact between the primary device and the secondary device.

The primary device is preferably configured to prevent the supply of power to the secondary device through the at least one electrical contact when the lid is not in the first position. By preventing the supply of power to the secondary device when the lid is not in the first position, the use of the secondary device when power is being supplied to the secondary device can be prevented.

The primary device may be configured to prevent the supply of power to the secondary device by ensuring a very high resistance between the at least one electrical contact and the secondary device when the lid is not in the first position. The primary device may be configured to prevent contact between the at least one electrical contact and the secondary device when the lid is not in the first position. The primary device may be configured to prevent a complete electrical connection being made between the primary device and the secondary device when the lid is not in the first position. By complete electrical connection it is meant that electricity is able to flow between the primary device and the secondary device.

In one alternative, the lid preferably comprises a means for preventing the supply of power to the secondary device when the lid is not in the first position. Preferably, the power prevention means comprises a switch. The switch may be a physical contact switch adapted to be closed when the lid is in the first position. The switch is in electrical connection with the power supply, and allows the supply of power to the secondary device when in the closed position. The switch may be a reed switch, where the reed switch is provided in the primary device adjacent the opening of the cavity, and the activating magnet is provided in the lid. The magnet is positioned in the lid such that when the lid is in the first position the magnet activates the reed switch allowing the supply of power to the secondary device. Alternatively, a Hall Effect transducer may be utilised. In this alternative, the Hall Effect transducer is positioned in the primary device adjacent the opening of the cavity. A magnet is provided in the lid such that when the lid is in the first position the magnet activates the Hall Effect transducer allowing the supply of power to the secondary device.

Preferably, in the first position the lid urges the secondary device into contact with the at least one electrical contact. By urging the secondary device into contact with the at least one electrical contact, the electrical resistance between the contact and the secondary device may be significantly reduced, and thus allow the supply of power to the secondary device.

As used herein, the term 'urges' or 'urging' means that a force is applied by one component to another component.

As used herein, the term 'resilient element' relates to an element that may be deformed or deflected by an applied force, but is capable of returning to its original position or state after the applied force is removed. When a resilient element is deformed or deflected by a force applied by a component moving towards the resilient element, the resilient element generates a reactive force that urges the component to move away from the resilient element. Examples of resilient elements include helical springs and cantilever springs.

Preferably, the electrical system further comprises at least one resilient element configured to urge the secondary device towards the lid when the secondary device is positioned in the cavity. Preferably, the at least one resilient element is configured to urge the secondary device towards the lid when the lid is in the first position. Preferably, the at least one resilient element is configured not to urge the secondary device towards the lid when the lid is in the second position. The resilient element may be configured to urge the secondary device at least partially out of the cavity when the lid is in the second position. By urging the secondary device at least partially out of the cavity, the secondary device may be more easily removed from the primary device. The at least one electrical contact is preferably the at least one resilient element.

Preferably, the cavity is an elongate cavity extending from the top of the primary device. The length of the cavity from its open end to its closed end is preferably at least as long as the secondary device.

Preferably, the electrical system further comprises a plurality of electrical contacts electrically connected to the source of electrical power. The electrical system may comprise two electrical contacts, a first electrical contact being connected to the positive terminal of the power supply, and a second electrical contact being connected to the negative terminal of the power supply.

In a further alternative, the supply of power is prevented by providing one resilient movable electrical contact, and one non-movable electrical contact. The movable electrical contact is configured to prevent the second non-movable electrical from engaging with the secondary device when the lid is not in the first position. This prevents the formation of a complete electrical connection until the lid is closed.

The electrical contacts are preferably made from metal. Preferably, the metal used to make the electrical contacts is copper beryllium. Preferably, at least a portion of the electrical contact is gold plated.

Preferably, the source of electrical power comprises a rechargeable battery. Preferably, the primary device comprises means for receiving external electrical power to recharge the rechargeable battery.

Preferably, the electrical power supply device is configured to provide power to the secondary device in a manner suitable to recharge a secondary battery in the secondary device.

The first position of the lid is preferably a closed position, and the second position of the lid is preferably an open position. When the lid is in the closed position, access to the secondary device is preferably substantially prevented. Furthermore, when the lid is in the closed position, preferably the secondary device cannot be removed from the primary device.

Preferably, the primary device further comprises a housing, wherein the lid is attached to the housing in both the first and second positions.

The housing preferably comprises a front wall, a back wall, a bottom wall, a top wall, a first side wall and a second side wall.

The terms "front", "back", "upper, "lower", "side", "top", "bottom", "left", "right" and other terms used to describe relative positions of the components of the primary device and secondary device refer to the primary device in an upright position with the opening of the cavity configured to receive the secondary device at the top end.

The term "longitudinal" refers to a direction from bottom to top or vice versa. The term "transverse" refers to a direction perpendicular to the longitudinal direction.

The primary device may be a substantially rectangular parallelepiped comprising two wider walls spaced apart by two narrower side walls and top and bottom walls. The secondary device is preferably elongate.

The lid is preferably a hinge lid. Preferably, the hinge extends across the top of the housing from the front wall to the back wall. The hinge may comprise a spring configured to retain the lid in the first position. The hinge may also comprise a damper configured to damp the motion of the lid when the lid is moved from the second position to the first position. Alternatively, the hinge may comprise a spring configured to retain the lid in the second position. In this alternative, the lid is preferably provided with means for retaining the lid in the first position, the retaining means being configured to provide sufficient force to overcome the force applied to the lid by the spring.

The retaining means may comprise at least one magnet and at least one corresponding ferrous element. The at least one magnet being provided in the housing of the primary device, and the ferrous element being provided in the lid. Alternatively, the retaining means may be a latch type arrangement.

The hinge lid may form the entire top of the housing. In this alternative, the hinge may be internal to the lid, and be adjacent a side wall of the housing.

Preferably, the secondary device is an electrically heated aerosol generating device. The aerosol generating device is designed to receive an aerosol generating article and be held by a user during the smoking experience. A power supply is preferably provided in the secondary device and is adapted to heat up the aerosol-forming substrate to operating temperature before aerosol generating begins. The power supply in the secondary device is also adapted to maintain the temperature of the aerosol-forming substrate during the aerosol generation. The source of electrical power in the primary device is preferably used to charge the secondary power supply during a charging mode when the secondary device is not in use.

The secondary device, in the form of an electrically heated aerosol generating device, is preferably of a similar size to or slightly larger than a lit-end cigarette. Thus, the secondary unit can be held between the user's fingers in a similar way to a lit-end cigarette.

Preferably, the secondary device comprises an electrical heating element, and the primary device is configured to be capable of providing power to the secondary device when the lid is in the first position to heat the electrical heating element to thermally liberate organic materials adhered to or deposited on the heating element. In use, an aerosol generating article is provided in the secondary device, in the form of an aerosol forming substrate. When the aerosol generating article is removed from the secondary device it may leave residue on the heater of the secondary device, and by heating the electrical heater to a temperature sufficient to liberate that organic residue the heater may be cleaned. This operation may be performed by the user activating a switch on the primary device, or after a predetermined number of charges of the secondary device, or either.

As used herein, an 'aerosol-generating device' relates to a device that interacts with an aerosol-forming substrate to generate an aerosol. The aerosol-forming substrate may be part of an aerosol-generating article, for example part of a smoking article. An aerosol-generating device may comprise one or more components used to supply energy from a power supply to an aerosol-forming substrate to generate an aerosol. For example, an aerosol-generating device may be a heated aerosol-generating device. An aerosol-generating device may be an electrically heated aerosol-generating device or a gas-heated aerosol-generating device. An aerosol-generating device may be a smoking device that interacts with an aerosol-forming substrate of an aerosol-generating article to generate an aerosol that is directly inhalable into a user's lungs thorough the user's mouth.

As used herein, the term 'aerosol-forming substrate' relates to a substrate capable of releasing volatile compounds that can form an aerosol. Such volatile compounds may be released by heating the aerosol-forming substrate. As an alternative to heating or combustion, in some cases volatile compounds may be released by a chemical reaction or by a mechanical stimulus, such as ultrasound. An aerosol-forming substrate may be solid or liquid or comprise both solid and liquid components. An aerosol-forming substrate may be adsorbed, coated, impregnated or otherwise loaded onto a carrier or support. An aerosol-forming substrate may conveniently be part of an aerosol-generating article or smoking article.

An aerosol-forming substrate may comprise nicotine. An aerosol-forming substrate may comprise tobacco, for example may comprise a tobacco-containing material containing volatile tobacco flavour compounds, which are released from the aerosol-forming substrate upon heating. In preferred embodiments an aerosol-forming substrate may comprise homogenised tobacco material, for example cast leaf tobacco. An aerosol-forming substrate may comprise at least one aerosol-former, such as propylene glycol or glycerine.

As used herein, the terms 'aerosol-generating article' and 'smoking article' refer to an article comprising an aerosol-forming substrate that is capable of releasing volatile compounds that can form an aerosol. For example, an aerosol-generating article may be a smoking article that generates an aerosol that is directly inhalable into a user's lungs through the user's mouth. An aerosol-generating article may be disposable. The term 'aerosol-generating article' is generally used hereafter.

Preferably an aerosol-generating article is a heated aerosol-generating article, which is an aerosol-generating article comprising an aerosol-forming substrate that is intended to be heated rather than combusted in order to release volatile compounds that can form an aerosol. The aerosol formed by heating the aerosol-forming substrate may contain fewer known harmful constituents than would be produced by combustion or pyrolytic degradation of the aerosol-forming substrate. An aerosol-generating article may be, or may comprise, a tobacco stick.

The presence of organic material or residue on a heating element may impair the user experience when consuming aerosol generating articles such as smoking articles. Thus, it may be preferred that the heater or heating elements of an aerosol-generating device (i.e. a secondary device) are regularly cleaned. Either the primary device or the aerosol-generating device may comprise an indicator that warns a user that the device is due to undergo a cleaning cycle. A controller located in either the aerosol-generating device or the primary device may determine when the device has undergone a predetermined number of smoking cycles without undergoing a cleaning cycle and may activate the indicator. If the user does not activate a cleaning cycle within a predetermined number of smoking cycles after the indicator has been activated, the user may be prevented from consuming further articles before a cleaning cycle is performed. Such a cleaning cycle may need to be manually activated or may occur automatically when the aerosol-generating device is loaded into the primary device after the need for cleaning has been determined. By preventing operation of the aerosol-generating device when there is a need for cleaning, a more pleasurable user experience may be delivered more consistently.

Preferably, the lid comprises at least one aperture allowing the escape of material from the cavity when the secondary device is in the cavity and the lid is in the first position. The aperture is preferably configured to allow the egress of the liberated organic material. Providing at least one aperture in the lid advantageously allows the venting of the cavity within the primary device to reduce build up of deposits.

Preferably, the secondary device is configured to operate in at least three modes. The at least three modes are preferably a charging mode, a cleaning mode, and an operating mode. The charging mode, and the cleaning mode are preferably only accessible when the secondary device is within the primary device and the lid is in the first position. The operating, that is to say aerosol generating, mode is preferably only available when the secondary device is not within the primary device.

Preferably, the secondary device comprises a rechargeable battery and the primary device is configured to provide power to the secondary device in a manner suitable to recharge the rechargeable battery in the secondary device when the secondary device is in contact with the at least one electrical contact.

Preferably, the secondary power supply is chargeable by the primary power supply, during the charging mode, so that the secondary power supply has sufficient charge to maintain the temperature of the aerosol-forming substrate at substantially the operating temperature during the smoking mode. If an optimum temperature is not reached then the amount and quality of an aerosol generated during operation of the device may be diminished. For example, different proportions of volatile elements may be generated when the heating element heats an aerosol-forming substrate to a lower temperature compared to when the substrate is heated to an optimum temperature, and this may alter the flavour of the aerosol. In order to deliver a more optimal and consistent user experience, it may be preferred that the secondary device can only be operated when the secondary power supply is in a fully charged condition. In the fully charged condition the secondary power supply should always be capable of heating the aerosol-forming substrate to an optimum temperature. As every operation of the secondary device will consume power from the secondary power supply, it may be preferred that the secondary device needs to be recharged before each operation. For example, an aerosol-generating device may be required to be recharged after every actuation before another smoking article can be consumed.

Insufficient charge may also result in an unsatisfactory user experience if the secondary device fails to have sufficient charge to heat the aerosol forming substrate over a time period sufficient to exhaust or substantially deplete the substrate of any aerosol that might be formed. Accordingly, in one embodiment the secondary device will prevent a user from beginning operation of the device unless sufficient power is available to complete an aerosol generating cycle. For example, if the aerosol generating is a smoking article including an tobacco based aerosol forming substrate, the secondary device may not permit a smoking experience unless sufficient power is present to maintain an operating temperature for at least 6 minutes.

Preferably, supply of electrical power from the primary power supply to the at least one heating element, during a pre-heating mode, is controlled by the secondary circuitry in the secondary device. Supply of electrical power from the primary power supply, during the charging mode, to charge the secondary power supply, may be controlled by the secondary circuitry in the secondary device.

The secondary device may be keyed to the cavity of the primary device such that only a secondary device compatible with the primary device can be inserted into the cavity. To effect the keying of the secondary device to the cavity of the primary device, the cavity may be provided with a specific non-regular shape, and the secondary device may be provided with a corresponding non-regular shape. In addition, to ensure the secondary device is inserted into the cavity in the correct orientation, the non-regular shape is preferably not rotationally symmetrical. As such, the secondary device may only be inserted into the cavity in one orientation.

The primary device may further comprise at least one contact configured to transfer data between the primary device and the secondary device. Preferably, the primary device further comprises at least two contacts configured to transfer data between the primary device and the secondary device. The primary device is preferably configured to only transfer data to, or receive data from, the secondary device when the lid is in the first position.

The at least one data transfer contact is preferably a resilient element. Preferably, the at least one data transfer contact is configured to prevent the supply of power to the secondary device when the lid is not in the first position. The at least one resilient data transfer contact is preferably movable from a first neutral position when the lid is in the second position, in which the at least one power supply electrical contact is not engaged with the secondary device, to a second deflected position when the lid is in the first position, in which the at least one data electrical contact and the at least one power supply electrical contact is are both in electrical contact with the secondary device.

Data may be communicated between both the secondary and primary device, as well as from the primary device to a computer interface capable of being read by a computer or other electronic device capable of transferring data to a computer or the internet. Preferably, the data connection operates under an interface standard. An interface standard is a standard that describes one or more functional characteristics, such as code conversion, line assignments, or protocol compliance, or physical characteristics, such as electrical, mechanical, or optical characteristics, necessary to allow the exchange of information between two or more systems or pieces of equipment. Examples of suitable interface standards for the communications link include, but are not limited to, the Recommended Standard 232 (RS-232) family of standards; USB; Bluetooth; FireWire (a brand name of Apple, Inc for their IEEE 1394 interface), IrDA (Infrared Data Association—a communications standard for the short-range exchange of data by Infrared light); Zigbee (a specification based on the IEEE 802.15.4 standard for wireless personal area networks) and other Wi-Fi standards.

According to another aspect of the present disclosure, there is provided an electrical system comprising a primary device and secondary device, wherein the primary device comprises: a source of electrical power; a cavity configured to receive the secondary device; at least one electrical contact within the cavity configured to contact a corresponding contact on the secondary device when the secondary device is in the cavity, the at least one electrical contact being electrically connected to the source of electrical power; and a lid moveable between a first position to retain the secondary device in the cavity and a second position in which the secondary device is free to move out of the cavity, wherein the lid comprises at least one aperture that allows material to escape from the cavity when the lid is in the first position.

The lid may be retained in the first position by mechanical means, such as a clasp, or by magnetic latching means. The lid may be retained in the first position by means of a spring closure force. For example, the lid may have a hinge that incorporates a locking mechanism. It may be preferable that the lid has a hinge that incorporates a damping mechanism to help prevent damage to the lid while the lid moves between the first position and the second position. The lid may, therefore, have a hinge that incorporates a rotary damper or a barrel damper mechanism.

According to a yet further aspect of the present disclosure, there is provided an aerosol generating system comprising an aerosol-forming substrate and an electrical system as described herein. The secondary device is an aerosol generating device that is configured to receive the aerosol-forming substrate. The lid is prevented from moving to the first position when the secondary device is in the cavity and the aerosol-forming substrate is received in the secondary device.

According to a still further aspect of the present disclosure, there is provided an aerosol generating device, comprising a heating element for heating an aerosol-forming substrate to form an aerosol; a rechargeable battery coupled to the heating element and configured to supply power to the heating element; and a controller coupled to the rechargeable battery, the controller configured to prevent activation of the heating element unless the rechargeable battery is charged above a predetermined threshold level. The elements comprised in the aerosol-generating device are preferably retained within a housing that also defines a substrate receiving chamber for receiving and locating an aerosol-forming substrate in proximity or contact with the heating element. It may be advantageous that the aerosol-forming substrate is a component element of an aerosol-generating article configured to be received in the substrate receiving cavity.

In one embodiment of the aerosol-generating device, the controller is configured to prevent operation of the heating element for a predetermined period after previous activation of the heating element. Alternatively, or in addition, the controller may be configured to prevent operation of the heating element based on a charge level of the rechargeable battery or based on an amount of power consumption following activation of the heating element. As discussed above, the amount and quality of an aerosol generated during operation may be impaired if the charge levels of the rechargeable battery are not sufficient to apply a predetermined thermal cycle to the aerosol-forming substrate.

The primary device may include a display (for example a digital display) indicating information to the user. For example, the display may indicate smoking article consumption, energy usage or other information. The display may further indicate when the secondary power supply has sufficient charge to be used to consume a smoking article.

According to a yet still further aspect of the present disclosure, there is provided an aerosol generating device comprising: a heating element; a power source coupled to the heating element and configured to supply power to the heating element; and a controller coupled to the heating element, the controller configured to control the supply of power to the heating element in a first mode to perform an aerosol generating cycle and in a second mode to perform a cleaning cycle, the controller further configured to monitor operation of the device and to prevent the supply of power in a first mode following performance of a threshold number of consecutive aerosol generating cycles without performance of a cleaning cycle. The elements comprised in the aerosol-generating device are preferably retained within a housing that also defines a substrate receiving chamber for receiving and locating an aerosol-forming substrate in proximity or contact with the heating element. It may be advantageous that the aerosol-forming substrate is a component element of an aerosol-generating article configured to be received in the substrate receiving cavity.

The aerosol-forming substrate preferably comprises a tobacco-containing material containing volatile tobacco flavour compounds which are released from the substrate upon heating. Alternatively, the aerosol-forming substrate may comprise a non-tobacco material. Preferably, the aerosol-forming substrate further comprises an aerosol former. Examples of suitable aerosol formers are glycerine and propylene glycol.

The aerosol-forming substrate may be a solid substrate. The solid substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco and expanded tobacco. Optionally, the solid substrate may contain additional tobacco or non-tobacco volatile flavour compounds, to be released upon heating of the substrate. Optionally, the solid substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix. The solid substrate may be deposited on the surface of the carrier in the form of, for example, a sheet, foam, gel or slurry. The solid substrate may be deposited on the entire surface of the carrier, or alternatively, may be deposited in a pattern in order to provide a non-uniform flavour delivery during use. Alternatively, the carrier may be a non-woven fabric or fibre bundle into which tobacco components have been incorporated. The non-woven fabric or fibre bundle may comprise, for example, carbon fibres, natural cellulose fibres, or cellulose derivative fibres.

The aerosol-forming substrate may be a liquid substrate and the smoking article may comprise means for retaining the liquid substrate. The aerosol-forming substrate may alternatively be any other sort of substrate, for example, a gas substrate, or any combination of the various types of substrate.

The primary unit may include storage means for at least one aerosol generating article, such as a smoking article including a tobacco aerosol forming substrate. The storage means may include storage for used smoking articles, unused smoking articles or both. This is advantageous since the primary unit and secondary unit together provide all the components required for the smoking mode.

One aspect may provide an aerosol-generating system comprising an aerosol-generating device for consumption of an aerosol-generating article, the aerosol-generating device comprising a heating element and a rechargeable power supply for powering the heating element, and a charging device for coupling to the aerosol-generating device to recharge the power supply and clean the heating element, in which the system is configured to prevent consumption of an aerosol-generating article when the aerosol-generating device is coupled to the charging device. The aerosol-generating device may be any aerosol-generating device or any secondary device as described herein. The charging device may be any charging device or primary device as described herein. The aerosol-generating article may be any aerosol-generating article or smoking article as described herein. The system may comprise a mechanical means for preventing consumption of an aerosol-generating article when the aerosol-generating device is coupled to the charging device. For example, it may not be possible to actuate the heating element when the aerosol-generating device is coupled to the charging device unless the aerosol-generating device is enclosed within the charging device by a lid. The lid is not able to close if the aerosol-generating device is coupled to an aerosol-generating article. The system may comprise electrical or software means for preventing consumption of an aerosol-generating article when the aerosol-generating device is coupled to the charging device. For example, sensors may detect the presence of an aerosol-generating article when the aerosol-generating device is coupled to the charging device and a controller may then prevent actuation of the heating element.

One aspect may provide an aerosol-generating device comprising a heating element and a power supply for powering the heating element, in which the device is configured to prevent actuation of the heating element unless the power supply has greater than a predetermined level of charge available for powering the heating element. It may be preferred that actuation of the heating element only occurs when the power supply is fully charged. The aerosol-generating device may be any aerosol-generating device or any secondary device as described herein.

One aspect may provide a method of delivering a consistent user experience to a consumer of an aerosol-generating article, the article being consumed by heating in an aerosol-generating device comprising a heating element and a power supply for powering the heating element, the method comprising the steps of, determining the charge level of the power supply, and only actuating the heating element if the charge available exceeds a predetermined threshold. The aerosol-generating device may be any aerosol-generating device or any secondary device as described herein. The aerosol-generating article may be any aerosol-generating article or smoking article as described herein.

One aspect may provide an aerosol-generating system comprising an aerosol-generating device for consumption of an aerosol-generating article, the aerosol-generating device comprising a heating element and a rechargeable power supply for powering the heating element, and a charging device for coupling to the aerosol-generating device to recharge the power supply and clean the heating element, in which the system is configured such that a user is prevented from consuming more than a predetermined number of aerosol-generating articles without cleaning the heating element when the aerosol-generating device is coupled to the charging device.

As used herein, means plus function features may be expressed alternatively in terms of their corresponding structure.

Any feature relating to one aspect may be applied to other aspects, in any appropriate combination. In particular, method aspects may be applied to apparatus aspects, and vice versa. Furthermore, any, some or all features in one aspect can be applied to any, some or all features in any other aspect, in any appropriate combination.

It should also be appreciated that particular combinations of the various features described and defined in any aspects of the invention can be implemented or supplied or used independently.

The invention will be further described, by way of example only, with reference to the accompanying drawings in which:

FIGS. 1(a) and 1(b) show a primary device and a secondary device respectively of an electrical system;

Figure 2:
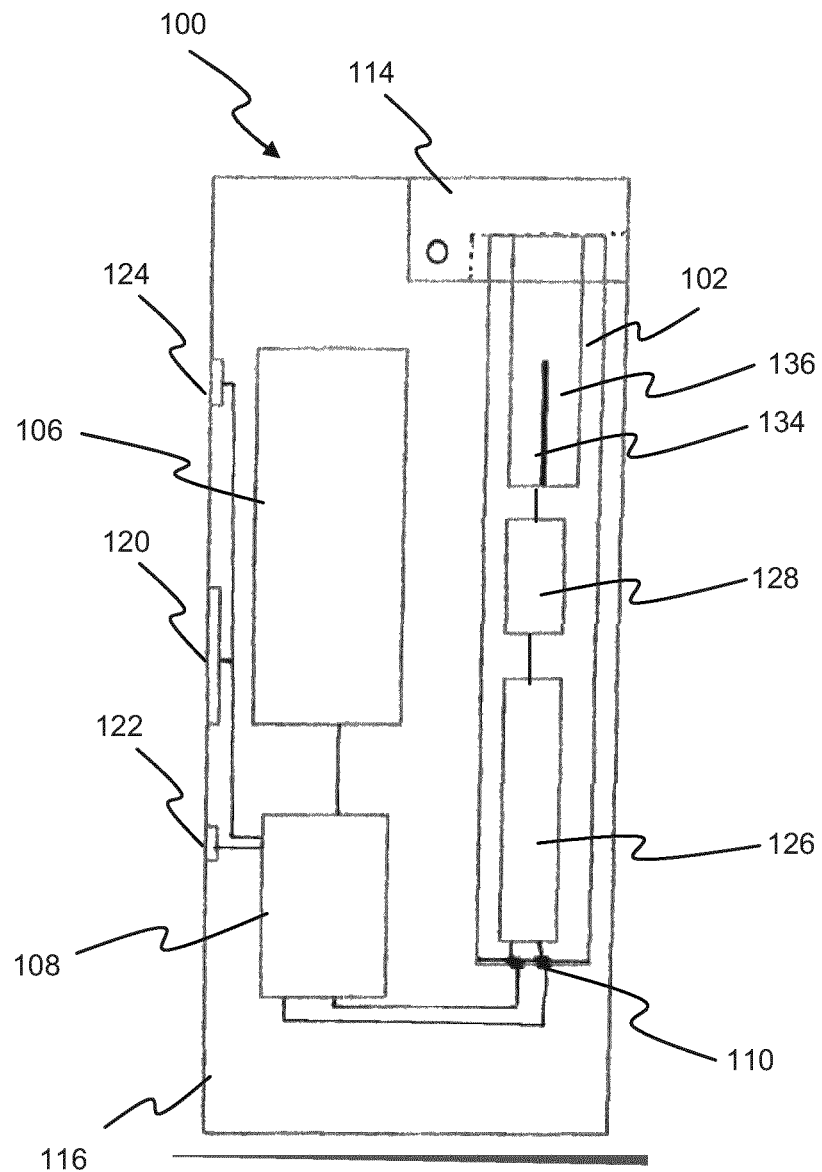
FIG. 2 shows the secondary device of FIG. 1(b) housed within the primary device of FIG. 1(a)

FIG. 1(a) shows a primary device 100. The primary device 100 in this example is a charging and cleaning unit for an electrically heated smoking system. FIG. 1(b) shows a secondary device 102. The secondary device 102 in this example is an electrically heated aerosol-generating device adapted to receive a smoking article 104 comprising an aerosol-forming substrate. The primary device 100 comprises a primary battery 106, control electronics 108, and electrical contacts 110 configured to provide electrical power to the secondary device, from the battery 106, when the secondary device is in connection with the electrical contacts 110. The primary device is configured to charge the secondary device utilising the battery 106. The electrical contacts 110 are provided adjacent the bottom of a cavity 112. The cavity is configured to receive the secondary device 102. A lid 114 is provided that is configured to secure the secondary device 102 within the cavity 112 of the primary device 100. The components of the primary device 100 are housed within the housing 116. The lid 114 is coupled to the housing 116 by hinge 118. The operation of the lid is described in further detail below.

In addition, the primary device 100 is provided with a series of three indicators 120, 122 and 124. The indicator 120 is provided to indicate the level of charge remaining in the primary battery 106. The indicator 120 is configured to indicate the percentage of the charge remaining in the primary battery. For example, 100% would indicate that the battery 106 is fully charged, and 50% would indicate that the battery 106 is half charged.

The second indicator 122 is provided to indicate that the secondary device 102 is fully charged, and ready to be used to generate an aerosol. The indicator 122 only indicates this state of readiness once the secondary device is capable of providing sufficient power to provide the user with a complete smoking experience; for example, sufficient power to aerosolise the entire aerosol forming substrate 104, or sufficient power to generate a predetermined number of puffs. In this specific embodiment, the secondary device 102 cannot be operated unless the rechargeable battery 126 is fully charged.

The third indicator 124 is provided to indicate that the secondary device is being cleaned. The cleaning operation is described in further detail below.

The secondary device 102 comprises a rechargeable battery 126, secondary control electronics 128 and electrical contacts 130. As described above, the rechargeable battery 126 of the secondary device 102 is configured to receive a supply of power from the primary battery 106 when the electrical contacts 130 are in contact with the electrical contacts 110 of the primary device 100 and the lid is in the closed position. The secondary device 102 further comprises a cavity 132 configured to receive the aerosol generating article 104. A heater 134, in the form of, for example, a blade heater, is provided at the bottom of the cavity 132. In use, the user activates the secondary device 102, and power is provided from the battery 126 via the control electronics 128 to the heater 134. The heater is heated to a standard operational temperature that is sufficient to generate an aerosol from the aerosol-forming substrate of the aerosol-generating article 104. The components of the secondary device 102 are housed within the housing 136.

The primary device is provided with four electrical contacts 110, two to supply power to the secondary device, and two to communicate data between the primary device and the secondary device. The data connection is configured to download data from the secondary device such as usage statistics, operational status information and the like. In addition, the data connection is configured to upload data from the primary device to the secondary device such as operating protocols. The operating protocols may include power supply profiles to be used when supplying power from the secondary power supply to the heater. Data may be communicated from the secondary device 102 to the primary device 100 and stored in, for example, control electronics 108. Data may then be communicated out of primary device 100 via communication port 138 which may be connected to control electronics 108.

FIG. 2 shows the secondary device 102 housed within the cavity of the primary device 100. The lid 114 is shown in the closed position. In this closed position the lid is configured to act on the secondary device 102 such that a good electrical connection is made between the primary device and the secondary device. As can be seen, the electrical contacts 130 of the secondary device are engaged with the electrical contacts 110 of the primary device. The electrical contacts 110 of the primary device are configured such that they apply a force to the secondary device when the lid is in the closed position. The electrical contacts 110 form resilient elements and, absent any opposing force from the secondary device, are in a neutral position such that they are displaced from the bottom surface of the cavity 112; see FIG. 1(a).

The dimensions of the primary device are such that the lid will not close if a smoking article 104 is housed within the secondary device. Therefore, the secondary device cannot be charged or cleaned when it is housing a smoking article, as the lid cannot be moved to the closed position that would enable power to be supplied to the secondary device. This may prevent the user from using the secondary device to generate an aerosol when the secondary device is being charged or cleaned.

The lid 114 is provided with means for retaining the lid in the closed position. The retaining means provides sufficient force such that the lid acts on the secondary device to deflect the electrical contacts from the position shown in FIG. 1(a) to the engaged position shown in FIG. 2. The retaining means is a spring within the hinge 118. Alternatively, or in addition, the lid may be provided with ferrous elements adapted to engage with magnets provided in the housing of the primary device.

Figure 3:
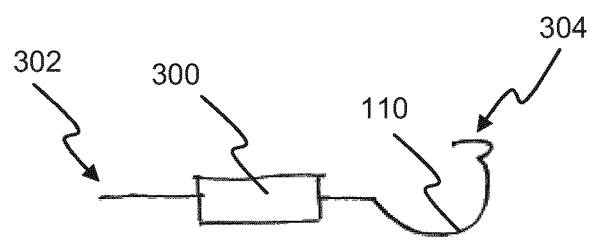
FIG. 3 shows a detail view of an electrical contact of the primary unit shown in FIGS. 1(a), and 2.

FIG. 3 shows a detail view of the electrical contact 110 of the primary unit. As can be seen, the electrical contact 110 is in the form of a leaf spring which enables the electrical contact 110 to be resilient in order to provide sufficient force to the secondary device, when the lid is in the closed position, to ensure a good electrical connection between the primary device and the secondary device. The electrical contact 110 is mounted to the primary device by support 300. The support 300 is configured such that the tail end 302 of the electrical contact remains substantially static as the secondary device is engaged with the electrical contact 110 at the contact end 304 and deflected from the neutral position shown in FIG. 1(a). The tail end 302 is connected to the control electronics by electrical wires, and thus by ensuring the tail end 302 remains substantially static during use reduces the possibility that the connection will fail due to fatigue. As described above, the primary device is provided with four such electrical contacts; two for electrical power, and two for data communication. The four electrical contacts are configured to provide a combined approximately 5N of force to the secondary device when the secondary device is in the cavity and the lid is in the closed position. The lid retaining means is therefore configured to provide approximately 7.5N of retaining force between the housing and the lid. The additional force is provided to reduce the possibility of the lid opening if the lid is accidentally knocked by the user during charging, or cleaning, of the secondary device.

Although a specific embodiment of the electrical contacts is provided herein, it will be obvious to the skilled person that any suitable configuration of electrical contacts may be used.

Figure 4:
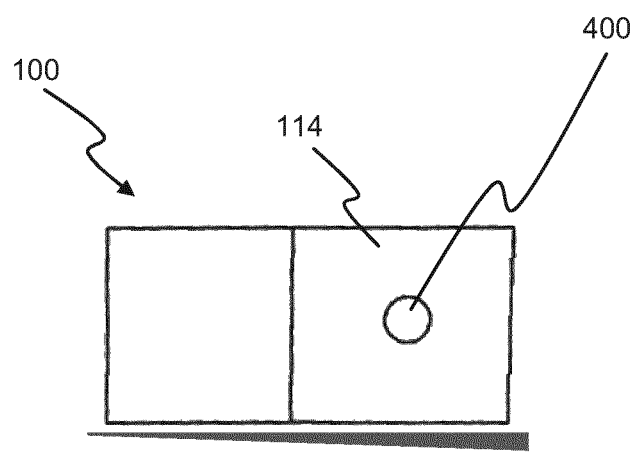
FIG. 4 shows a top view of the primary device.

As described above, the primary device is also configured to perform a cleaning operation on the secondary device. The cleaning operation involves supplying sufficient electrical power to the secondary device to enable the heater 134 to be heated above its standard operational temperature to a cleaning temperature. The cleaning temperature is sufficient to liberate any remaining aerosol forming substrate that may remain affixed to the blade heater after the smoking article 104 has been removed from the secondary device 102. As shown in FIG. 4 the lid 114 comprises a vent hole 400 which is configured to allow the liberated aerosol forming substrate to leave the cavity, for example in the form of an aerosol such as smoke. During the cleaning operation, the third indicator 124 is illuminated to inform the user that the secondary device is being cleaned. During this cleaning operation the user may be prevented from opening the lid to remove the secondary device.

It is of course to be understood that the specification is not intended to be restricted to the details of the above embodiments which are described by way of example only.

The invention claimed is:

1. An electrical system comprising a primary device and secondary device, the primary device comprising:
   a source of electrical power;
   a cavity configured to receive the secondary device;
   a plurality of electrical contacts within the cavity configured to contact corresponding contacts on the secondary device when the secondary device is in the cavity, the plurality of electrical contacts being electrically connected to the source of electrical power; and
   a lid moveable between a first position to retain the secondary device in contact with at least one of the plurality of electrical contacts, and a second position in which the secondary device is free to move out of contact with the at least one electrical contact, wherein the lid comprises at least one aperture that allows organic material to escape from the cavity when the secondary device is in the cavity and when the lid is in the first position.

2. The electrical system according to claim 1, wherein the primary device is configured to prevent the supply of power to the secondary device through the plurality of electrical contacts when the lid is not in the first position.

3. The electrical system according to claim 1, wherein in the first position the lid urges the secondary device into contact with the plurality of electrical contacts.

4. The electrical system according to claim 1, further comprising at least one resilient element configured to urge the secondary device towards the lid when the secondary device is positioned in the cavity.

5. The electrical system according to claim 4, wherein the at least one of the plurality of electrical contacts is the at least one resilient element.

6. The electrical system according to claim 1, wherein the source of electrical power is configured to provide power to the secondary device in a manner suitable to recharge a secondary battery in the secondary device.

7. The electrical system according to claim 1, wherein the secondary device is an electrically heated aerosol-generating device.

8. The electrical system according to claim 7, wherein the secondary device comprises an electrical heating element, and wherein the primary device is configured to provide power to the secondary device when the lid is in the first position to heat the electrical heating element to thermally liberate organic materials adhered to or deposited on the heating element.

9. The electrical system according to claim 7, wherein the secondary device comprises a rechargeable battery and wherein the primary device is configured to provide power to the secondary device in a manner suitable to recharge the rechargeable battery in the secondary device when the secondary device is in contact with the at least one electrical contact.

10. An aerosol-generating system comprising an aerosol-forming substrate and an electrical system according to claim 1, wherein the secondary device is an aerosol-generating device that is configured to receive the aerosol-forming substrate, and wherein the lid is prevented from moving to the first position when the secondary device is in the cavity and the aerosol-forming substrate is received in the secondary device.

* * * * *